United States Patent
Robertson et al.

(10) Patent No.: US 8,107,974 B2
(45) Date of Patent: *Jan. 31, 2012

(54) PROBABILISTIC LOCATION PREDICTION FOR A MOBILE STATION

(75) Inventors: Ian Robertson, Waterloo (CA); Tom Nagy, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/102,031

(22) Filed: May 5, 2011

(65) Prior Publication Data

US 2011/0207486 A1 Aug. 25, 2011

Related U.S. Application Data

(63) Continuation of application No. 12/564,015, filed on Sep. 21, 2009, now Pat. No. 7,962,156, which is a continuation of application No. 11/167,146, filed on Jun. 28, 2005, now Pat. No. 7,653,400.

(51) Int. Cl.
*H04W 24/00* (2009.01)

(52) U.S. Cl. ............... 455/456.5; 455/456.1; 455/456.2; 455/41.2; 370/329; 370/338

(58) Field of Classification Search ....... 455/456.1–457, 455/41.2; 370/328, 338
See application file for complete search history.

(56) References Cited

U.S. PATENT DOCUMENTS

| | | | |
|---|---|---|---|
| 4,533,918 A | 8/1985 | Virnot | |
| 5,724,346 A * | 3/1998 | Kobayashi et al. | 370/329 |
| 5,758,313 A | 5/1998 | Shah et al. | |
| 5,802,492 A | 9/1998 | DeLorme et al. | |
| 5,844,522 A * | 12/1998 | Sheffer et al. | 342/457 |
| 5,949,775 A * | 9/1999 | Rautiola et al. | 370/338 |
| 6,052,598 A | 4/2000 | Rudrapatna et al. | |
| 6,108,555 A * | 8/2000 | Maloney et al. | 455/456.2 |
| 6,138,016 A * | 10/2000 | Kulkarni et al. | 455/433 |
| 6,236,365 B1 | 5/2001 | LeBlanc et al. | |
| 6,256,506 B1 | 7/2001 | Alexander, Jr. et al. | |
| 6,259,924 B1 | 7/2001 | Alexander, Jr. et al. | |
| 6,263,208 B1 | 7/2001 | Chang et al. | |
| 6,385,454 B1 | 5/2002 | Bahl et al. | |
| 6,728,545 B1 | 4/2004 | Belcea | |

(Continued)

FOREIGN PATENT DOCUMENTS

EP 1302783 4/2003

OTHER PUBLICATIONS

Francois, Jean-Mark, "Learning Movement Patterns in Mobile Networks: a Generic Method", 2004.

(Continued)

*Primary Examiner* — Sharad Rampuria

(74) *Attorney, Agent, or Firm* — Integral Intellectual Property Inc.; Miriam Paton

(57) ABSTRACT

A probabilistic prediction is made of the location of a wireless-enabled mobile station in a wireless local area network. The prediction includes calculating a vector representing movement of the mobile station through a space in which two or more access points of the network are located, and determining a region surrounding the vector in which the mobile station has at least a given probability to be located within a certain period of time.

22 Claims, 4 Drawing Sheets

U.S. PATENT DOCUMENTS

| | | | |
|---|---|---|---|
| 6,889,053 | B1 | 5/2005 | Chang et al. |
| 6,993,337 | B2 | 1/2006 | Rudrapatna et al. |
| 7,002,943 | B2 | 2/2006 | Bhagwat et al. |
| 7,046,647 | B2 | 5/2006 | Oba et al. |
| 7,054,296 | B1 | 5/2006 | Sorrells et al. |
| 7,103,370 | B1 | 9/2006 | Creemer |
| 7,110,779 | B2 * | 9/2006 | Billhartz et al. ............ 455/456.2 |
| 7,116,988 | B2 | 10/2006 | Dietrich et al. |
| 7,139,252 | B2 * | 11/2006 | Babu et al. .................... 370/312 |
| 7,196,662 | B2 | 3/2007 | Misikangas et al. |
| 7,271,765 | B2 | 9/2007 | Stilp et al. |
| 7,295,119 | B2 | 11/2007 | Rappaport et al. |
| 7,312,752 | B2 | 12/2007 | Smith et al. |
| 7,319,877 | B2 | 1/2008 | Krumm et al. |
| 7,319,878 | B2 * | 1/2008 | Sheynblat et al. ......... 455/456.3 |
| 7,340,259 | B2 | 3/2008 | Maloney et al. |
| 7,433,694 | B2 * | 10/2008 | Morgan et al. ............. 455/456.1 |
| 7,532,113 | B2 * | 5/2009 | Horvitz et al. ........... 340/539.13 |
| 7,570,962 | B2 * | 8/2009 | Chou ........................ 455/456.5 |
| 7,653,400 | B2 | 1/2010 | Robertson et al. |
| 7,714,778 | B2 | 5/2010 | Dupray |
| 7,741,967 | B2 * | 6/2010 | Valeriano et al. ........ 340/539.11 |
| 7,764,231 | B1 | 7/2010 | Karr et al. |
| 7,830,852 | B2 * | 11/2010 | Twitchell, Jr. ................ 370/338 |
| 7,899,006 | B2 * | 3/2011 | Boyd ........................... 370/328 |
| 7,941,096 | B2 * | 5/2011 | Perkins et al. ................ 455/41.2 |
| 7,978,076 | B2 * | 7/2011 | Fast et al. .................... 340/572.1 |
| 2003/0065712 | A1 | 4/2003 | Cheung et al. |
| 2003/0134648 | A1 | 7/2003 | Reed et al. |
| 2003/0224799 | A1 | 12/2003 | Squibbs et al. |
| 2004/0166864 | A1 | 8/2004 | Hill et al. |
| 2004/0263388 | A1 | 12/2004 | Krumm et al. |
| 2005/0020278 | A1 | 1/2005 | Krumm et al. |
| 2005/0144318 | A1 | 6/2005 | Chang |
| 2005/0208952 | A1 | 9/2005 | Dietrich et al. |
| 2005/0258957 | A1 | 11/2005 | Krumm et al. |

OTHER PUBLICATIONS

Hye-Soo, Kim, "Selective Channel Scanning for Fast Handoff in Wireless LAN using Neighbor Graph", 2004.

Lavin, David A, "Shadow Cluster Concept for Resource Allocation and Call Admission in ATM-Based Wireless Networks", 1995.

Liu, Tong, "Mobility Modeling, Location Tracking, and Trajectory Prediction in Wireless ATM Networks", Aug. 1998.

Mishra, Arunesh, "Context Caching using Neighbor Graphs for Fast Hands off in a Wireless Network", 2004.

Pack, S., "Fast Handoff Scheme Based on Mobility Prediction in Public Wireless LAN Systems", Oct. 2004.

Pathirana, Pubudu N., "Mobility Modelling and Trajectory Prediction for Cellular Networks with Mobile Base Stations", 2003.

Rabe, M, Examination Report for EP 05105773.5-2412, Apr. 5, 2006.

Rabe, M, Extended European Search Report for EP 05105773.5, Dec. 1, 2005.

Yavas, Gokhan, "A Data Mining Approach for Location Prediction in Mobile Environments", May 2004.

* cited by examiner

PROBABILISTIC LOCATION PREDICTION FOR A MOBILE STATION

CROSS-REFERENCE TO RELATED APPLICATIONS

This application is a continuation of U.S. patent application Ser. No. 12/564,015, filed Sep. 21, 2009, now U.S. Pat. No. 7,962,156, issued Jun. 14, 2011, which is itself a continuation of U.S. patent application Ser. No. 11/167,146, filed Jun. 28, 2005, now U.S. Pat. No. 7,653,400, issued Jan. 26, 2010, and both of which are incorporated by reference in their entirety.

BACKGROUND OF THE INVENTION

The invention generally relates to wireless networks. In particular, embodiments of the invention relate to probabilistic prediction of a location of a wireless-enabled mobile station.

Wireless networks, specifically those based on the Institute of Electrical and Electronic Engineers (IEEE) 802.11 standard, are experiencing rapid growth. Some users, for example laptop users, use the network while stationary (or associated with a single access point (AP)), and before moving, the user ceases operation only to continue using the network after moving to a new location. This is known as "discrete mobility" and "nomadic roaming". Other users, for example voice-based application users, use the network while moving. This is known as "continuous mobility" and "seamless roaming".

Currently, the handoff procedure as a mobile station roams from one AP to another entails too much latency to support voice and multimedia applications. This handoff procedure results in a transfer of physical layer connectivity and state information from one AP to another with respect to the mobile station. Moreover, APs have limited resources, and it is possible that as a mobile station enters the coverage area of an AP, that AP does not have the resources to support the mobile station.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, and components have not been described in detail so as not to obscure the embodiments of the invention.

Figure 1:
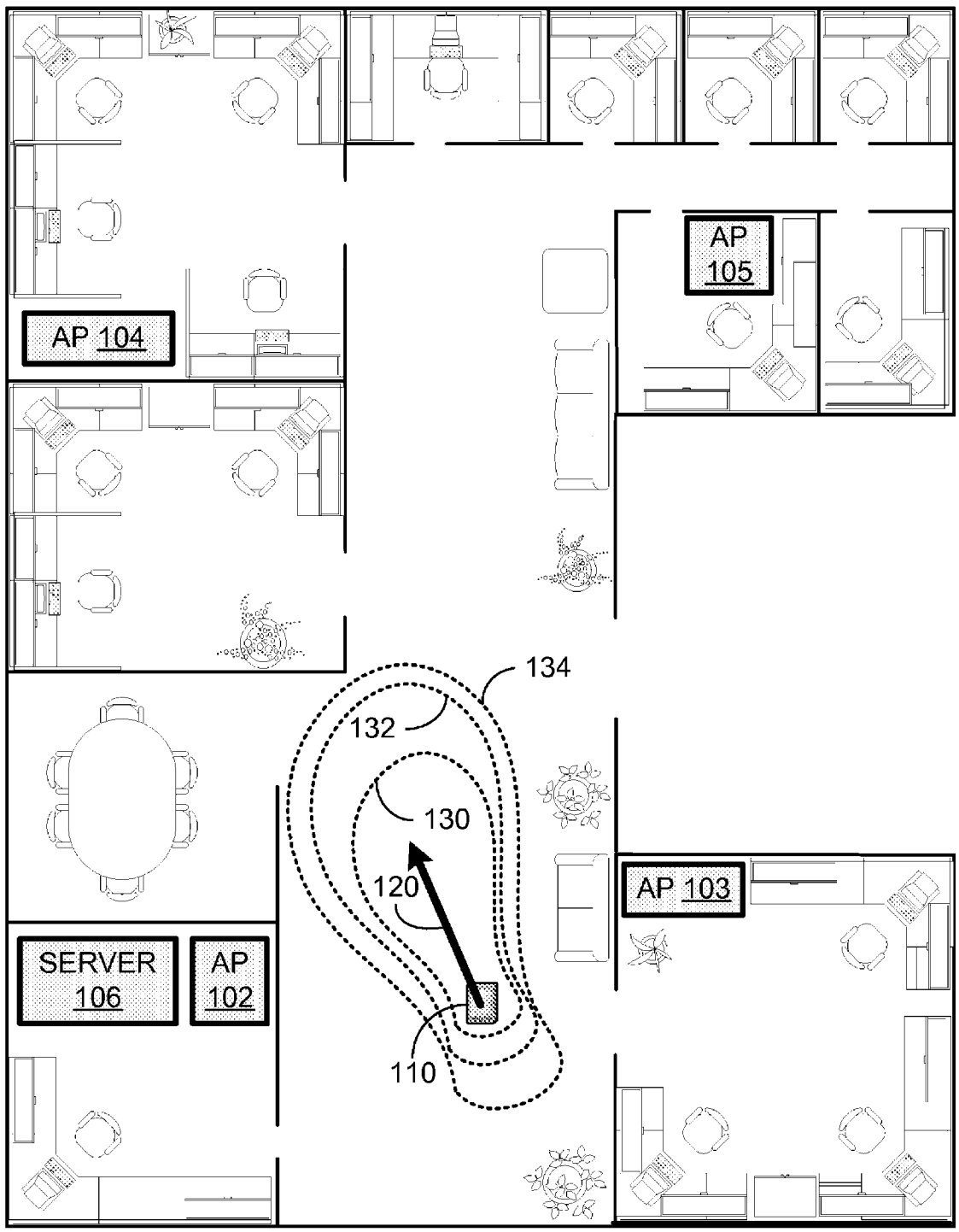
FIG. 1 is an illustration of an exemplary deployment of a wireless local area network (LAN) in a building, according to an embodiment of the invention. The LAN includes access points (APs) and a switched, routed fabric including a server.

FIG. 1 is an illustration of an exemplary deployment of a wireless local area network (LAN) in a building, according to an embodiment of the invention. The WLAN includes APs 102, 103, 104 and 105 and a switched, routed fabric including a server 106.

A mobile station 110 may be active in the WLAN. A non-exhaustive list of examples for mobile station 110 includes a wireless-enabled laptop, a wireless-enabled cellphone, a wireless-enabled personal digital assistant (PDA), a wireless-enabled video camera, a wireless-enabled gaming console, a wireless Internet-Protocol (IP) phone and any other suitable wireless-enabled mobile station.

In the example of FIG. 1, APs 102, 103, 104 and 105, server 106 and mobile station 110 are "IEEE 802.11-enabled", which means that wireless communications in the WLAN via the respective WLAN controllers of the wireless devices are in accordance with one or more of the following standards defined by the Institute of Electrical and Electronic Engineers (IEEE) for Wireless LAN MAC and Physical layer (PHY) specifications: IEEE 802.11, published 1997; IEEE 802.11a, published 1999; IEEE 802.11b, published 1999; IEEE 802.11g, published 2003. However, it will be obvious to those of ordinary skill in the art how to modify the following for other existing WLAN standards or future related standards, including IEEE 802.11i, IEEE 802.11n and IEEE 802.11r.

Figure 2:
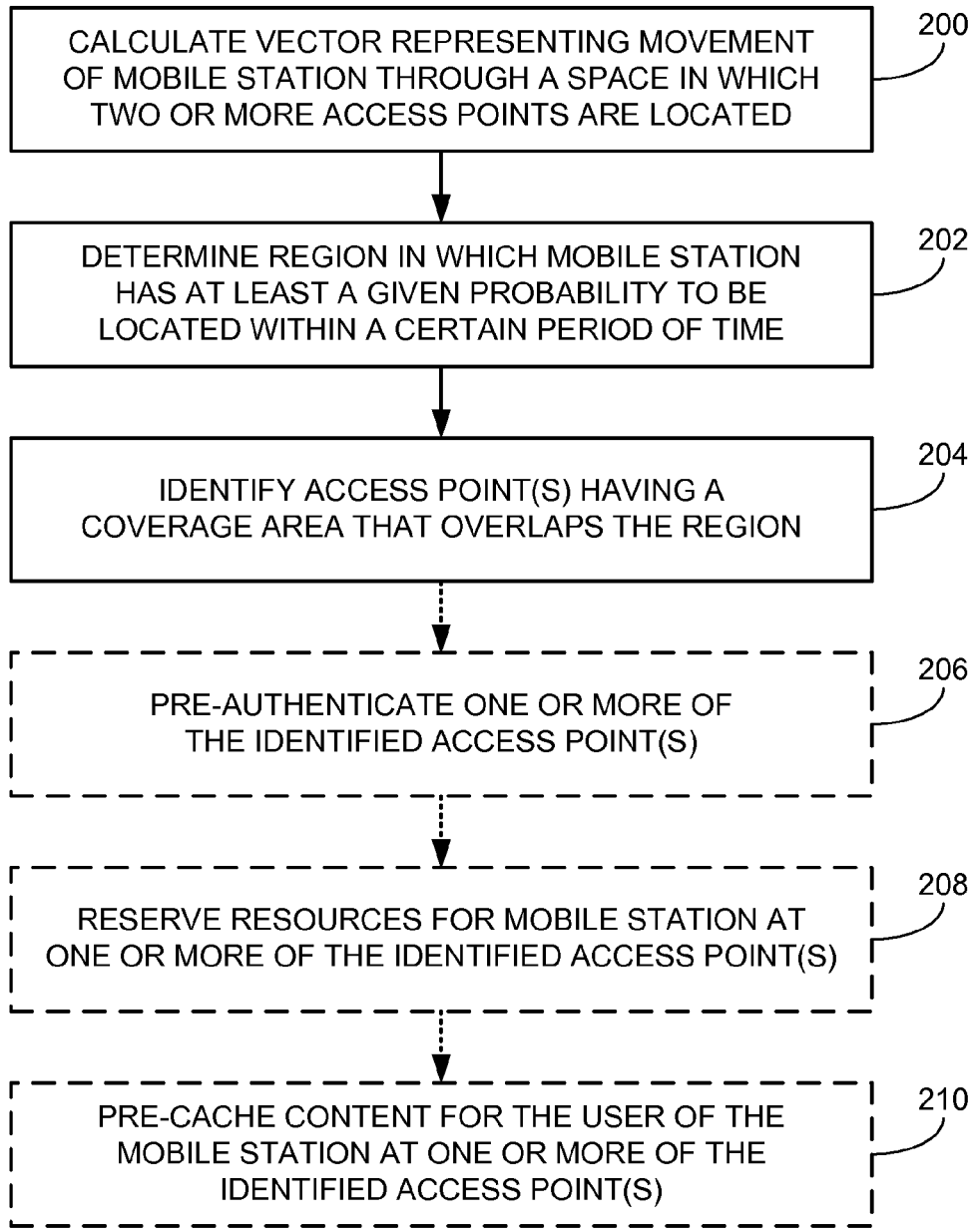
FIG. 2 is a flowchart of a method implemented at least in part by the server of FIG. 1, according to an embodiment of the invention.

FIG. 2 is a flowchart of a method implemented, at least partially, by server 106, according to an embodiment of the invention.

A vector representing motion of mobile station 110 is calculated (200). The vector may be calculated by server 106, or by mobile station 110 and then transmitted wirelessly via the WLAN to server 106 for further processing.

An exemplary vector 120 is shown in FIG. 1, based at the current position of mobile station 110, having a direction representing the direction of motion of mobile station 110 and a length representing the speed of motion of mobile station 110. The vector may be calculated on the basis of any one or any combination of instantaneous, projected and historic information. The information may be specific to mobile station 110 or to a group or class of users to which mobile station 110 belongs, or may be global information applicable to all mobile stations. The historic information may be incorporated using a forgetting factor so that more recent information has more of an effect than less recent information.

For example, mobile station 110 may transmit signal strength measurements to server 106 as it moves through the building, and server 106 may use these measurements, the fixed locations of APs 102, 103, 104 and 105, and the layout of the building to calculate the vector. In this example, the signal strength measurements are specific to mobile station 110, and the fixed locations of the access points in the network and the layout of the building are global information applicable to all mobile stations.

In another example, mobile station 110 may transmit global positioning system (GPS) information to server 106, and server 106 may use this information to calculate the vector. In this example, the GPS information is specific to mobile station 110 and may include instantaneous and/or historical information.

In another example, server 106 may use handoff information regarding mobile station 110 and/or regarding mobile stations belonging to a class or group of users to which mobile station 110 also belongs. For example, if mobile station 110 belongs to a user in a group of users that generally roam in a certain pattern in the building, for example, users that share an office, then that certain roaming pattern may be used to calculate the vector. Moreover, if mobile station 110 belongs to a user in a particular class of users, for example, managers, that frequently roam to certain locations in the building, for example, the meeting room, then that information may be used to calculate the vector. In a further example, women who work in one building and then roam to another building tend to visit the meeting rooms and women's washrooms of the other building and never visit the men's washrooms of the other building. In yet another example, maintenance and facilities staff access areas of buildings (for example, heating, ventilation and air conditioning areas, wiring rooms) that other staff members do not.

Server 106 then determines a region in which mobile station 110 is likely to be located with at least a given probability within a certain period of time (202). Three exemplary regions 130, 132 and 134 are shown in FIG. 1. Regions 130 and 132 are for the same period of time, but the probability that mobile station 110 is located in region 130 is higher than the probability that mobile station 110 is located in region 132. Regions 132 and 134 are for the same probability, but region 134 is for a longer period of time than region 132.

Although vector 120 and regions 130, 132 and 134 are illustrated as planar in FIG. 1, embodiments of this invention may be generalized to three dimensions when appropriate, for example, buildings with multiple floors.

Similarly, although this description relates to a single vector and a region around the vector, persons of ordinary skill in the art can modify embodiments of this invention to apply to a sequence of vectors or a curved path approximated thereby.

Server 106 may take various factors into account when determining the region. A non-exhaustive list of examples for such factors includes:
1. Global Factors
    a) a user of a mobile station tends to move in a straight line;
    b) it is unlikely that a user will reverse direction;
    c) the physical structure of a building will affect the route of a user of a mobile station (for example, the placement of walls, stairs, doors, elevators and the like).
2. Class/Group Factors
    a) visitors to the building tend to visit certain areas;
    b) users with preferred access to resources may be allotted larger regions than normal users;
    c) the history of routes of other users in the same class or group;
3. Individual Factors
    a) the individual history of the user;
    b) the user is sedentary, or the user moves around a lot;
    c) if the user is in a wheelchair, exclude routes involving stairs, increase the likelihood of visiting wheelchair-accessible washrooms, and decrease the likelihood of entering non-wheelchair-accessible rooms.

The historic information may be incorporated using a forgetting factor so that more recent information has more of an effect than less recent information.

For example, if mobile station 110 is stationary, and no other factors are taken into account, the vector is a point and the region may be a circle around mobile station 110. As mobile station 110 moves, this circle may be deformed in the direction of motion. The faster mobile station 110 moves in a particular direction, the longer the vector representing the motion of mobile station 110, and the more deformed the region is from a circle and the more area covered by the region.

Once server 106 has determined the region in which mobile station 110 has at least a given probability to be located within a certain period of time, server 106 may identify which, if any, of APs 102, 103, 104 and 105 have a coverage area that overlaps, even partially, the determined region (204). For example, the coverage areas of APs 102 and 103 may overlap regions 130, 132 and 134, while the coverage area of AP 104 may overlap regions 132 and 134 only, and the coverage area of AP 105 may not overlap any of regions 130, 132 and 134.

The coverage areas of the APs may have been calculated or measured. For example, server 106 may calculate the coverage area of an access point based on its location, make, model and some characteristic data for such an access point. In another example, server 106 may dynamically calculate the coverage area of an access point from collected data of when, where and at what received signal strength indication (RSSI) mobile stations roam.

A non-exhaustive list of examples for actions that server 106 may take upon identifying the access points includes:
a) Initiating pre-authentication processes with one or more of the identified APs (206), by signaling either mobile station 110 or the AP to begin and with which communications partner. For example, pre-authentication may be performed at the Data Link layer ("layer 2") of the WLAN, or at the Data Link layer ("layer 2") and the Network layer ("layer 3") of the WLAN, according to the Open Systems Interconnection (OSI) communication model. If regions of different given probabilities are determined, pre-authentication at "layer 2" and "layer 3" may be done for APs that are accessible by mobile station 110 from within the region of higher probability and pre-authentication at "layer 2" may be done for APs that are accessible by mobile station 110 only from within the region of lower probability. Pre-authentication may accelerate the handoff procedure as mobile station 110 roams from one AP to another.

b) Reserving resources for mobile station 110 at one or more of the identified APs (208). For example, if mobile station 110 has a probability of 60% of roaming to a particular AP within 1 minute, bandwidth may be reserved for mobile station 110 at the particular AP. However, if a different mobile station has a probability of 90% of roaming to the particular AP, the resource needs of the different mobile station may trump the needs of mobile station 110.

c) Pre-caching or routing content for the user of mobile station 110 at one or more of the identified APs (210). A non-exhaustive list of examples for this content includes targeted advertising, telephone calls, and the like.

d) Notifying voice over IP (VoIP) servers that a call endpoint might be about to roam (so that the call data could start to be multicasted to the APs in the region).

e) Initiating roaming procedures to other networks (for example, roaming from the WLAN to a cellular network).

f) Updating presence information (which in turn can be used to route phone calls, update calendar appointments, create lists of meeting attendees, notify conference call participants of the names of people in the room on the other end, and the like).

Figure 3:
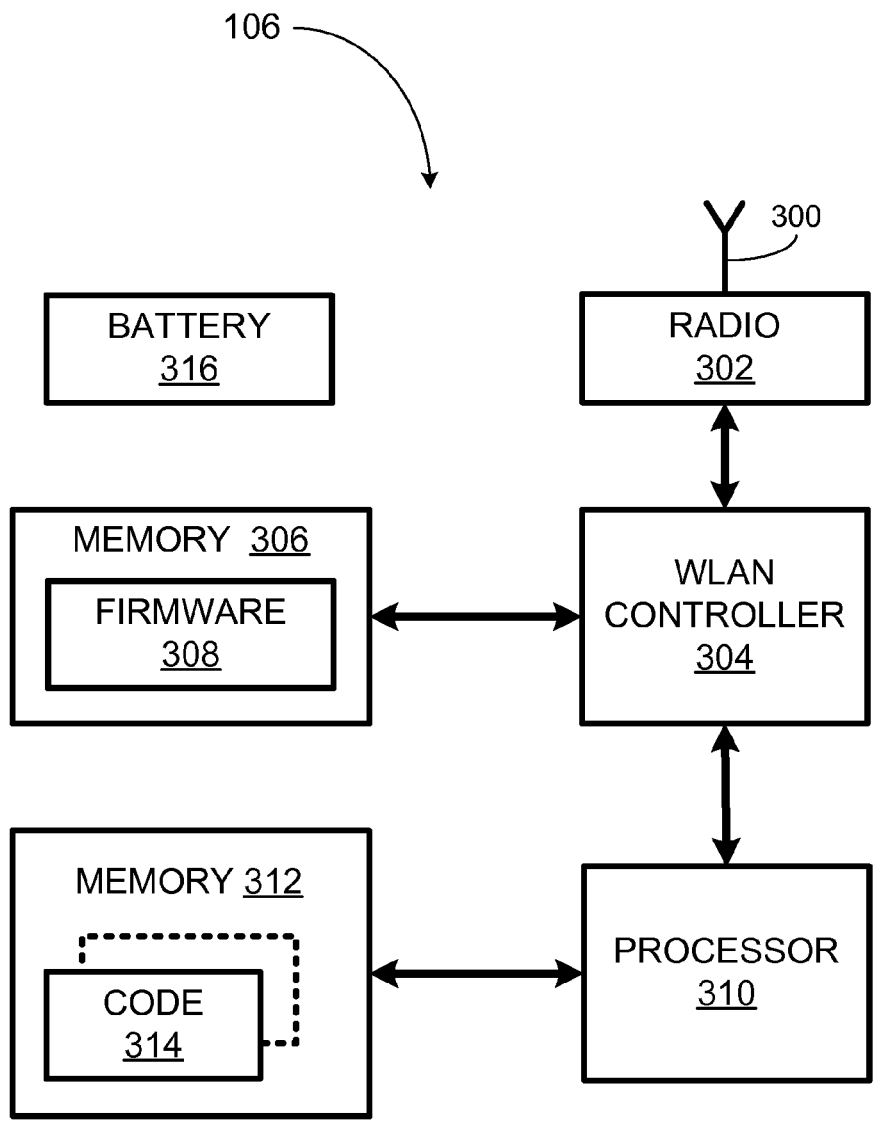
FIG. 3 is a block diagram of an exemplary server, according to some embodiments of the invention.

FIG. 3 is a block diagram of an exemplary server, according to some embodiments of the invention. Server 106 includes at least one antenna 300 coupled to a radio 302, which in turn is coupled to a WLAN controller 304. WLAN controller 304 may be coupled to a memory 306 storing firmware 308 to be executed by WLAN controller 304. Server 106 includes a processor 310 and a memory 312 coupled to processor 310. Memory 312 may store executable code 314 to be executed by processor 310. Executable code 314, when executed by processor 310, may cause server 106 to implement all or a portion of the method of FIG. 2.

Processor 310 may be coupled to WLAN controller 304 and may be able to control, at least in part, the operation of WLAN controller 304. Server 106 includes a battery 316 to provide power to radio 302, WLAN controller 304, processor 310 and memories 306 and 312. Server 106 may include other components that, for clarity, are not shown.

Radio 302, WLAN controller 304, processor 310 and memories 306 and 312 are functional blocks and may be implemented in any physical way in server 106. For example, radio 302, WLAN controller 304, processor 310 and memories 306 and 312 may be implemented in separate integrated circuits, and optionally in additional discrete components. Alternatively, some of the functional blocks may be grouped in one integrated circuit. Furthermore, the functional blocks may be parts of application specific integrated circuits (ASIC), field programmable gate arrays (FPGA) or application specific standard products (ASSP).

Figure 4:
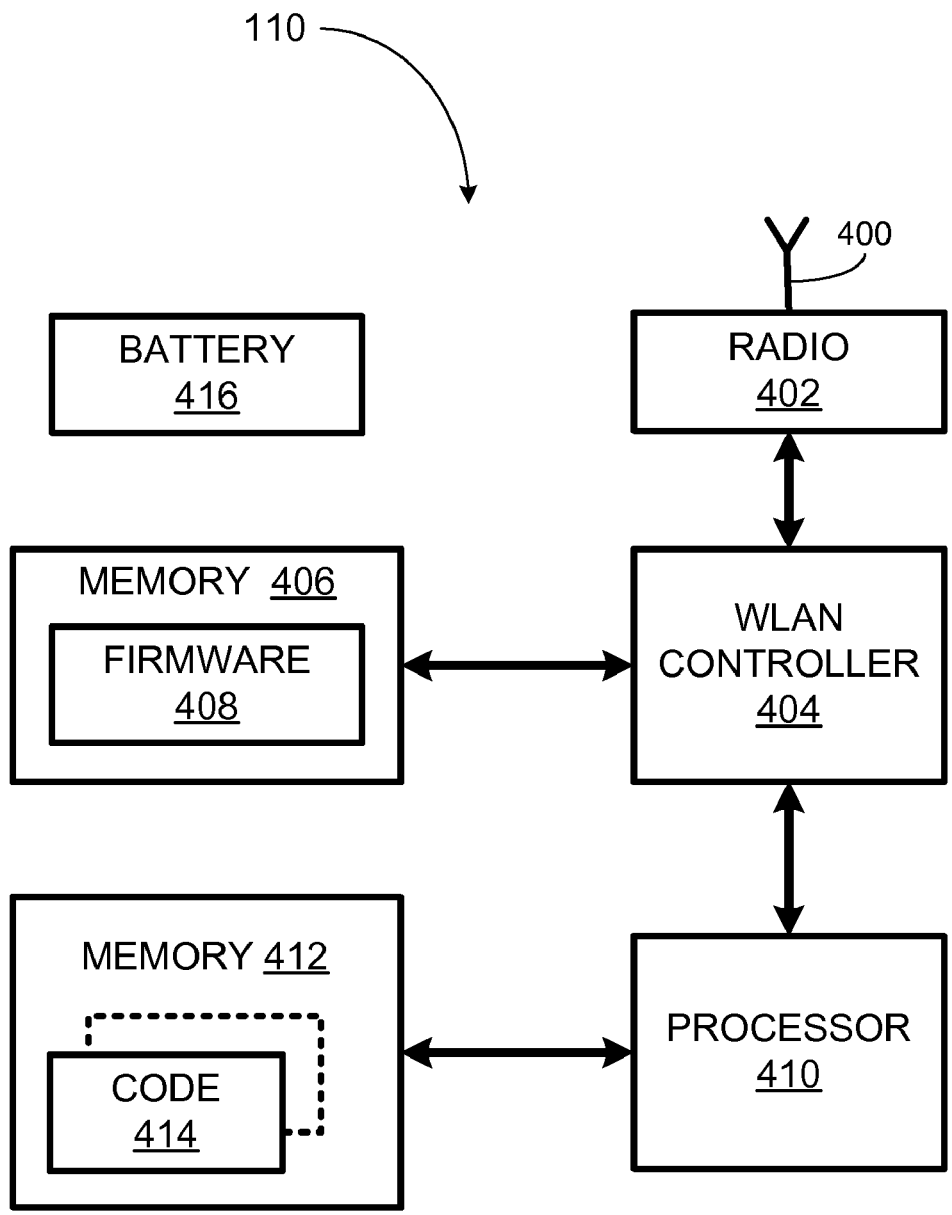
FIG. 4 is a block diagram of an exemplary mobile station, according to some embodiments of the invention.

FIG. 4 is a block diagram of an exemplary mobile station, according to some embodiments of the invention. Mobile station 110 includes at least one antenna 400 coupled to a radio 402, which in turn is coupled to a WLAN controller 404. WLAN controller 404 may be coupled to a memory 406 storing firmware 408 to be executed by WLAN controller 404. Mobile station 110 includes a processor 410 and a memory 412 coupled to processor 410. Memory 412 may store executable code 414 to be executed by processor 410. Executable code 414, when executed by processor 410, may cause mobile station 110 to calculate a vector representing movement of mobile station 110 through a space in which two or more APs are located, as at 200 of the method of FIG. 2.

Processor 410 may be coupled to WLAN controller 404 and may be able to control, at least in part, the operation of WLAN controller 404. Mobile station 110 includes a battery 416 to provide power to radio 402, WLAN controller 404, processor 410 and memories 406 and 412. Mobile station 110 may include other components that, for clarity, are not shown.

Radio 402, WLAN controller 404, processor 410 and memories 406 and 412 are functional blocks and may be implemented in any physical way in mobile station 110. For example, radio 402, WLAN controller 404, processor 410 and memories 406 and 412 may be implemented in separate integrated circuits, and optionally in additional discrete components. Alternatively, some of the functional blocks may be grouped in one integrated circuit. Furthermore, the functional blocks may be parts of application specific integrated circuits (ASIC), field programmable gate arrays (FPGA) or application specific standard products (ASSP).

A non-exhaustive list of examples for processors 310 and 410 includes a central processing unit (CPU), a digital signal processor (DSP), a reduced instruction set computer (RISC), a complex instruction set computer (CISC) and the like.

Memories 306 and 312 may be fixed in or removable from server 106. Similarly, memories 406 and 412 may be fixed in or removable from mobile station 110. A non-exhaustive list of examples for memories 306, 312, 406 and 412 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

A non-exhaustive list of examples for antennae 300 and 400 includes a dipole antenna, a monopole antenna, a multi-layer ceramic antenna, a planar inverted-F antenna, a loop antenna, a shot antenna, a dual antenna, an omnidirectional antenna and any other suitable antenna.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A server configured to collect data of when, where and at what received signal strength indication mobile stations roam in a wireless local area network, and to dynamically calculate from said data a coverage area of an access point in said wireless local area network, further configured to calculate a vector representing movement of a wireless-enabled mobile station through a space in which two or more access points of said wireless local area network are located and to determine a region surrounding said vector in which said mobile station has at least a given probability to be located within a certain period of time.

2. The server as claimed in claim 1, further configured to identify, using at least said calculated coverage area and said determined region, which of said access points are accessible by said wireless-enabled mobile station from within said region.

3. The server as claimed in claim 2, further configured to reserve resources for said wireless-enabled mobile station at one or more of said access points identified as accessible from within said region.

4. The server as claimed in claim 2, further configured to pre-authenticate said wireless-enabled mobile station at one or more of said access points identified as accessible from within said region.

5. A server configured to calculate a vector representing movement of a wireless-enabled mobile station through a space in which two or more access points of a wireless local area network are located and to determine a region surrounding said vector in which said wireless-enabled mobile station has at least a given probability to be located within a certain period of time, wherein said vector is calculated based, at least in part, on information that is specific to a group or class of users to which the user of said mobile station belongs.

6. The server as claimed in claim 5, further configured to identify which of said access points are accessible by said wireless-enabled mobile station from within said region.

7. The server as claimed in claim 6, further configured to reserve resources for said wireless-enabled mobile station at one or more of said access points identified as accessible from within said region.

8. The server as claimed in claim 6, further configured to pre-authenticate said wireless-enabled mobile station at one or more of said access points identified as accessible from within said region.

9. A method for probabilistic prediction of a location of a mobile station in a wireless local area network, the method comprising:

collecting data of when, where and at what received signal strength indication mobile stations roam in a wireless local area network;
dynamically calculating from said data a coverage area of an access point in said wireless local area network;
calculating a vector representing movement of a wireless-enabled mobile station through a space in which two or more access points of said wireless local area network are located; and
determining a region surrounding said vector in which said mobile station has at least a given probability to be located within a certain period of time.

10. The method as claimed in claim 9, further comprising:
identifying, using at least said calculated coverage area and said determined region, which of said access points are accessible by said wireless-enabled mobile station from within said region.

11. The method as claimed in claim 10, further comprising:
reserving resources for said wireless-enabled mobile station at one or more of said access points identified as accessible from within said region.

12. The method as claimed in claim 10, further comprising:
pre-authenticating said wireless-enabled mobile station at one or more of said access points identified as accessible from within said region.

13. A method for probabilistic prediction of a location of a mobile station in a wireless local area network, the method comprising:
calculating a vector representing movement of said mobile station through a space in which two or more access points of said wireless local area network are located; and
determining a region surrounding said vector in which said mobile station has at least a given probability to be located within a certain period of time,
wherein as said mobile station moves from a stationary state, said region is a deformed circle that is deformed in a direction of motion of said mobile station.

14. The method of claim 13, further comprising:
identifying which of said access points are accessible by said mobile station from within said region.

15. The method of claim 14, further comprising:
reserving resources for said mobile station at one or more of said access points identified as accessible from within said region.

16. The method of claim 14, further comprising:
pre-authenticating said mobile station with one or more of said access points identified as accessible from within said region.

17. The method of claim 14, further comprising:
pre-authenticating, at the Data Link layer of said wireless local area network according to the Open Systems Interconnection communication model, said mobile station with one or more of said access points identified as accessible from within said region.

18. The method of claim 14, further comprising:
pre-authenticating, at the Data Link layer and the Network layer of said wireless local area network according to the Open Systems Interconnection communication model, said mobile station with one or more of said access points identified as accessible from within said region.

19. A computer-readable medium having instructions thereon which, when executed by a server, results in collecting data of when, where and at what received signal strength indication mobile stations roam in a wireless local area network, and dynamically calculating from said data a coverage area of an access point in said wireless local area network, and further result in calculating a vector representing movement of a wireless-enabled mobile station through a space in which two or more access points of said wireless local area network are located and determining a region surrounding said vector in which said mobile station has at least a given probability to be located within a certain period of time.

20. The computer-readable medium as claimed in claim 19, wherein the instructions, when executed by the server, further result in identifying, using at least said calculated coverage area and said determined region, which of said access points are accessible by said wireless-enabled mobile station from within said region.

21. The computer-readable medium as claimed in claim 20, wherein the instructions, when executed by the server, further result in reserving resources for said wireless-enabled mobile station at one or more of said access points identified as accessible from within said region.

22. The computer-readable medium as claimed in claim 20, wherein the instructions, when executed by the server, further result in pre-authenticating said wireless-enabled mobile station at one or more of said access points identified as accessible from within said region.

* * * * *